F. R. TODD.
MANURE SPREADER.
APPLICATION FILED APR. 26, 1912. RENEWED JULY 22, 1915.
1,174,102.
Patented Mar. 7, 1916.
2 SHEETS—SHEET 2.
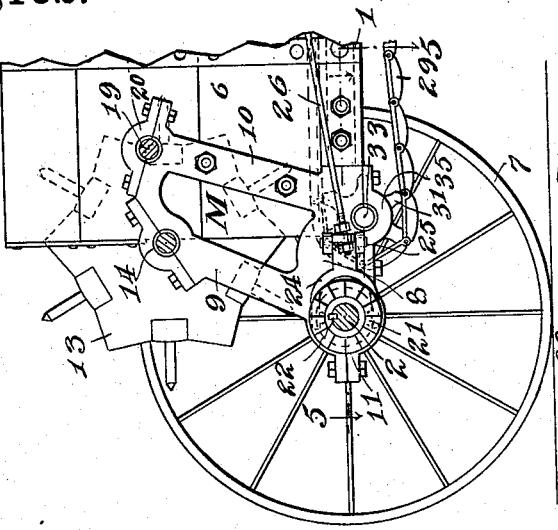
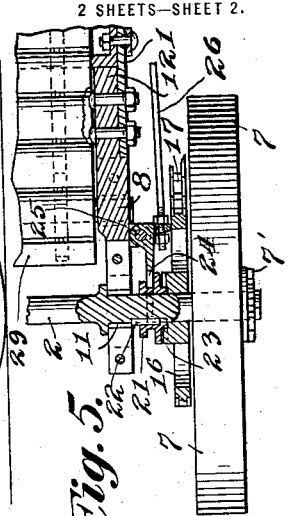
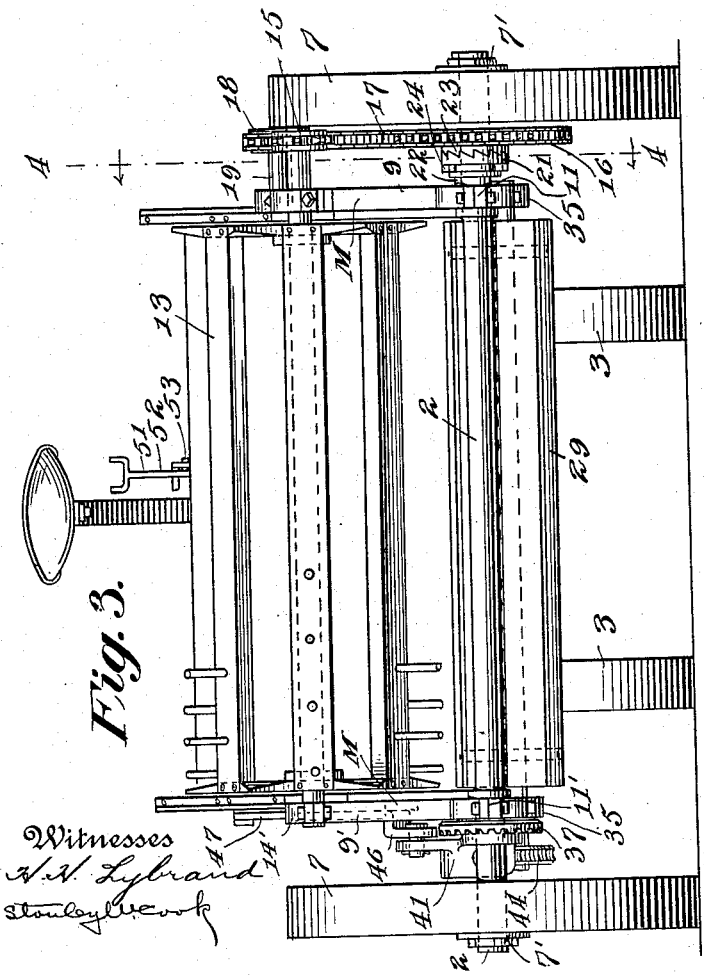
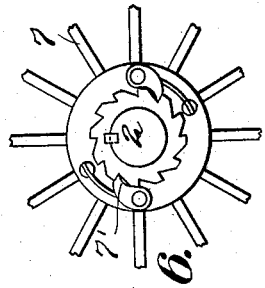
Inventor
Floyd R. Todd
Witnesses
Attorney

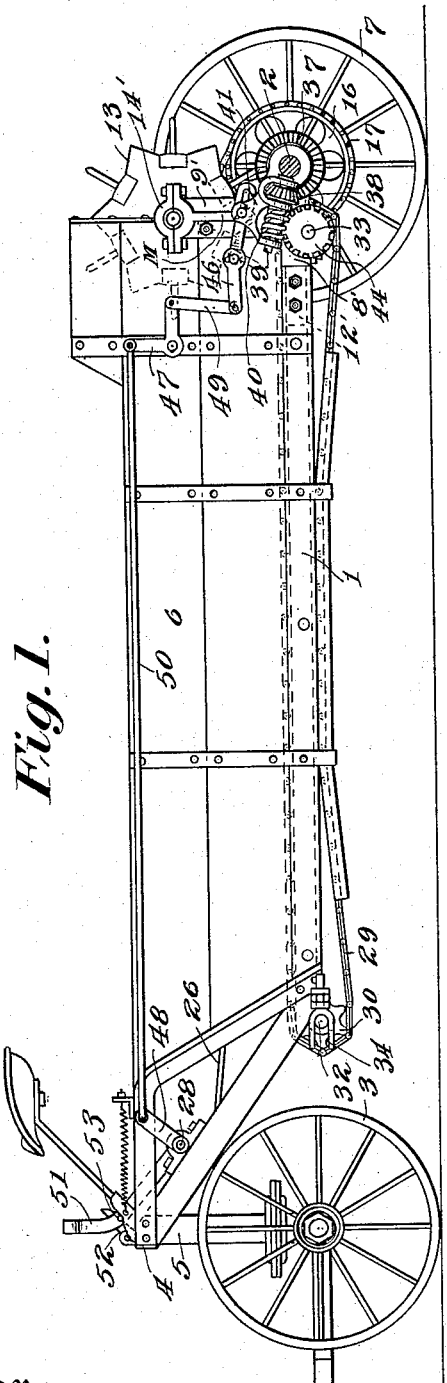
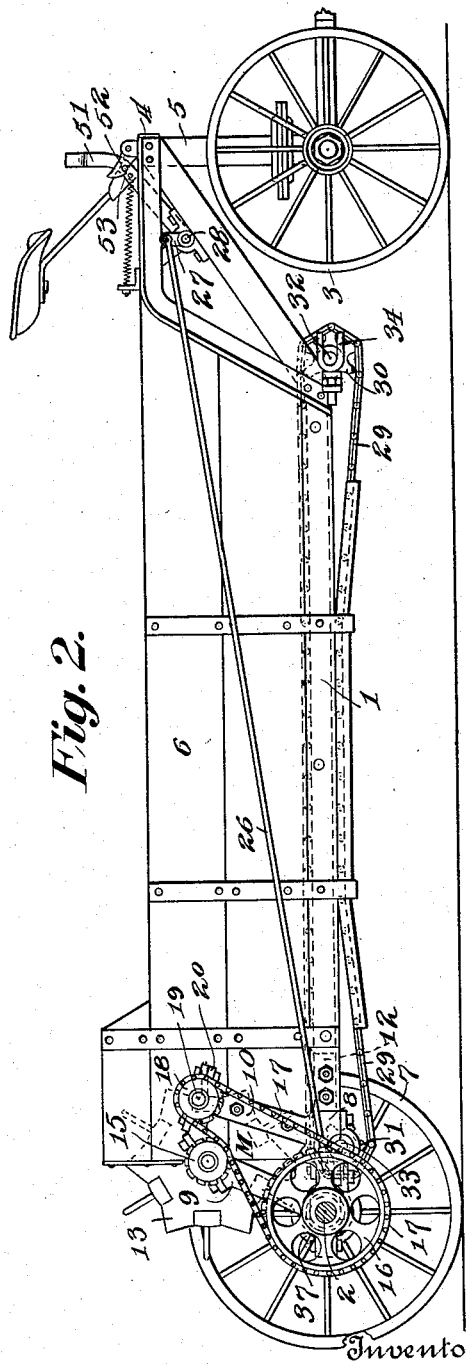

UNITED STATES PATENT OFFICE.

FLOYD R. TODD, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,174,102.    Specification of Letters Patent.    Patented Mar. 7, 1916.

Application filed April 26, 1912, Serial No. 693,434. Renewed July 22, 1915. Serial No. 41,413.

*To all whom it may concern:*

Be it known that I, FLOYD R. TODD, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in fertilizer distributers, and in particular to that class of distributers comprising those in which each machine consists of a body structure having a movable bottom and a rear-wheel-and-beater structure.

The body structure comprises sills carrying a box having a movable bottom upon which the load is supported and fed rearward to be distributed. The front end of the body structure is suitably supported on a pivoted truck carrying the front wheels while the rear part of the body is supported from the brackets which unite and bind together the rear-wheel-and-beater structure, and the movable bottom feeding device.

In the drawings, Figure 1 is a side elevation of the machine with one rear wheel removed to show the movable bottom driving devices. Fig. 2 is an elevation of the side opposite to that shown in Fig. 1 with one rear wheel removed to show the beater driving devices. Fig. 3 is a rear elevation of the machine. Fig. 4 is a vertical sectional view on the line 4—4 of Fig. 3. Fig. 5 is a fragmentary horizontal sectional view on the line 5—5 of Fig. 4 and shows the beater operating clutch. Fig. 6 is a detail of the wheel and axle ratchet mechanism. Fig. 7 is a detail of the bracket for supporting the apron driving bevel and worm.

In the drawings, the numerals 1, 1 indicate the side walls which are formed of continuous channel sections extending from adjacent the rear axle 2 forward, and are upwardly inclined at the front ends to a point above the tops of the front wheels 3. The front ends of the sills are joined by a cross piece 4 which is mounted upon the forward wheel supports 5. Side boards 6, 6 are mounted upon the sills 1, 1 and comprise the sides of the body structure.

Mounted upon the ends of the rear axle 2 are the rear ground wheels 7. The ground wheels drive the axle through ratchet devices 7' which permit one wheel to rotate faster than the other when necessary, as in turning corners. The rear-wheel-and-body structure is mounted upon, and held in rigid relation by two brackets indicated in general by the letters M. The bracket on the beater driving side is of somewhat rectangular shape having a base portion 8 and two upward extending arms 9 and 10. The axle 2 which supports the rear structure is carried in suitable bearings 11 and 11' upon the base sections of the brackets M. One end of the base 8 is in the form of an arm 12 which extends within and is securely bolted to the side sill 1 thus detachably uniting the body structure and the rear-wheel-and-beater structure. One end of a rotatable beater 13 is journaled in a bearing 14 near the upper end of the rectangular bracket M and carries on this end a sprocket wheel 15. The bracket M on the opposite side of the machine is of an inverted T-shaped form, the base portion 8' having one end or arm 12' attached to the sill, the other end encircling the axle. The upright 9' carries the beater bearing 14'. The axis of the beater is located in front of the axis of the ground wheels and sufficiently above so that the teeth of the beater will not come in contact with the through axle 2.

In order to drive the distributing beater at a high rate of speed and in a direction opposite to the direction in which the ground wheels rotate, a large sprocket 16 is loosely mounted upon the rear axle and carries a chain 17 which under-runs the sprocket 15 on the beater shaft and passes over an idler sprocket 18. The idler sprocket 18 is carried by a stub shaft 19 journaled in bearings 20 secured to the bracket M at the upper end of the arm 10. A clutch of any suitable form may be interposed between the axle and the better driving sprocket 16. I have shown for the clutch mechanism a jawed collar 21 slidable upon the axle 2 but made to rotate with the axle by means of a feather key 22. The hub of the sprocket 16 is provided with jaws or teeth 23 registering with those on the collar 21 so that when the collar 21 is slid into contact with the teeth 23, the sprocket 16 is caused to rotate with the axle. A yoke 24 engages with a groove in the collar 21 for the purpose of sliding it into or out of engagement with the teeth on the sprocket. The yoke is pivoted at a point 25 and is operated by a rod 26 which extends forward to a lever 27 secured to a transverse shaft 28 at the forward part of the machine.

The movable bottom on which the load rests comprises an endless apron 29 extending around the sprockets 30, located at the front of the machine, and 31, located at the rear of the machine. The sprockets 30 and 31 are mounted upon transverse shafts 32 and 33, respectively. The forward shaft 32 extends transverse the body structure and is carried by suitable bearings 34 secured to the continuous sills 1, 1. The shaft 33 carrying the rear sprockets 31, around which the apron travels, is journaled at its ends in bearings 35 carried by the base portion of the brackets M.

For the purpose of driving the endless apron at a comparatively slow speed, I have illustrated a common type of reduction gearing. This comprises a bevel gear 37 keyed to the rear axle 2 at the end opposite to that on which the beater driving sprocket is mounted. Meshing with the bevel gear is a bevel pinion 38 secured to a rotatable shaft 39 on the opposite end of which is secured a worm gear 40. This shaft is supported in a bracket 41, one end of which surrounds the axle and therefore allows the shaft to be swung in an arc about the rear axle as a center. A worm gear 44 is secured upon an end of the apron shaft 33 and meshes with the worm 40. Since it is necessary to provide a means for disconnecting the apron drive so that the movable bottom may remain motionless when the rear axle is in motion, I have provided a system of links and levers connected to the bracket 41 by means of which the shaft 39 may be rotated through a small arc in a perpendicular plane about the axle as a center. In order to give this bracket the proper motion, it is connected to a bell crank 46 pivoted to the frame and interconnected by cranks 47, 48, and links 49 and 50 to the transverse shaft 28.

It is desirable that the apron driving and beater driving mechanism be thrown into and out of engagement at the same time. And for this purpose I have connected them both to the transverse shaft 28 located near the driver's seat. Connected to the shaft 28 is a foot lever 51. A foot latch 52 is also provided to engage with a rod 53 on the foot lever so that the lever may be locked in its forward position.

In other machines where the beater is positioned in advance of the axle with the movable bottom below the horizontal plane of the axle, it is necessary to drive the heavy rotating beater at a speed greater than is required solely for performing the function of disintegrating and spreading the load. This is due to the fact that the uppermost parts of the beater are located at a point where the material discharged would be thrown directly upon the rear axle and driving gears, if the beater were not maintained at a sufficiently high speed to throw the material over these parts.

By altering the relation of the axle, movable bottom and beater axis to the position described, I have made it possible to reduce the beater speed to that ordinarily used in spreaders and still retain the advantages of this general arrangement. The axle, while approximately the same horizontal distance to the rear of the beater axis as in the machines above referred to, is positioned considerably lower, so that the material shot off from the periphery of the beater has ample time to pass rearward before it drops to the horizontal plane of the axle. The reduction in speed of the heavy rotating beater is important, as one of the difficulties in making an efficient fertilizer distributer is the proper mounting of the parts to withstand the stresses and strains resulting from the rapidly rotating beater.

The rear part of the machine is rigidly bound together as a unit by heavy brackets carried by the axle and supporting both the beater and apron driving shaft. By mounting the beater upon a heavy bracket carried by the axle, I transmit all of the stresses and strains caused by these heavy rotating parts directly to the ground wheels.

One disadvantage of the low-down spreader having a through axle is that the beater is so close to the ground that as material is shredded and thrown rearward it does not have the opportunity as with the high type spreaders of separating and becoming thoroughly pulverized before reaching the ground. In my present invention I retain the advantage of the through axle for bracing and strengthening the entire structure, at the same time having the load in a low-down position with the beater at a sufficient elevation to allow the material to thoroughly disintegrate before striking the ground. Since it is necessary that the beater fingers attack the material before it leaves the apron to prevent its discharging against and clogging at the axle, the apron has been placed in a horizontal plane above the axle and is tangential to the periphery of the beater at a point in front of the axle. A further advantage in this arrangement of parts is the shortening of the wheel base for a given length of load carrying space over other machines in which the through axle is used with the beater and apron in positions ahead of the axle. In raising the beater to a position above and still ahead of the axle, the advantages gained by using a through axle are fully utilized in that the beater structure is supported directly upon the axle and therefore transmits the stresses and strains due to this rapidly revolving part directly to the ground wheels instead of to the load carrying frame and box.

What I claim is:

1. In a fertilizer distributer, the combination of the body structure, the axle, the ground wheels carried by the axle, the beater located ahead of the axle, and the movable bottom terminating in front of the axle for supporting and feeding the load rearward in planes above the axle and below the axis of the beater.

2. In a fertilizer distributer, the combination of the body structure, the through axle, the ground wheels carried by the axle, the beater located ahead of the axle, and a movable bottom terminating in front of the axle located in a plane above the axle for supporting and feeding the load rearward on horizontal lines intersecting the beater.

3. In a fertilizer distributer, the combination of the body structure, the axle, ground wheels carried by the axle, the beater located ahead of and carried directly by the axle, and the movable bottom terminating in front of the axle located in a plane above the axle for supporting and feeding the load rearward on horizontal lines intersecting the beater.

4. In a fertilizer distributer, the combination of the body structure, the axle, ground wheels carried by the axle, a beater located ahead of the axle, and the movable bottom positioned to feed the load rearward to the beater in planes above and ahead of the axis of the ground wheels on horizontal lines intersecting the beater.

5. In a fertilizer distributer, the combination of the body structure, the axle, the ground wheels carried by the axle, the beater located ahead of and carried directly by the axle, and the movable bottom terminating ahead of and positioned to feed the load rearward to the beater in planes above the axis of the ground wheels on horizontal lines intersecting the beater.

6. In a fertilizer distributer, the combination of the body structure, the axle, the ground wheels carried by the axle, the beater located ahead of the axle, the movable bottom terminating ahead of the axle for feeding the load rearward to the beater, the shaft around which the movable bottom travels, and rigid brackets carried by the axle and supporting the beater and the said shaft.

In testimony whereof I affix my signature, in presence of two witnesses.

FLOYD R. TODD.

Witnesses:
H. B. McFahin,
A. T. Adams.

Copies of this patent may be obtained for five cents each, by addressing the "Commissioner of Patents, Washington, D. C."